United States Patent [19]
Brown et al.

[11] Patent Number: 6,166,137
[45] Date of Patent: Dec. 26, 2000

[54] POLY(ARYLENE ETHER)/ POLYETHERIMIDE BLENDS AND METHODS OF MAKING THE SAME

[75] Inventors: Sterling Bruce Brown, Niskayuna, N.Y.; Brenda A. Giles, Mt. Vernon; Yimin Jin, Newburgh, both of Ind.; Darryl Nazareth, Flanders, N.J.; Steven Thomas Rice, Scotia, N.Y.; Robert Puyenbroek, Bergen op Zoom, Netherlands; Barbara J. McKinley, Rochester, N.Y.

[73] Assignee: General Electric Company, Pittsfield, Mass.

[21] Appl. No.: 09/208,364

[22] Filed: Dec. 10, 1998

[51] Int. Cl.$^7$ .............................. C08L 71/10; C08L 79/08
[52] U.S. Cl. ...................... 525/133; 525/397; 525/430; 525/436; 524/262; 524/269
[58] Field of Search ................................. 525/133, 397, 525/430, 436; 524/262, 269

[56] References Cited

U.S. PATENT DOCUMENTS

| | | | |
|---|---|---|---|
| 4,431,779 | 2/1984 | White et al. | 525/425 |
| 4,663,378 | 5/1987 | Allen | 524/267 |
| 4,942,206 | 7/1990 | White et al. | 525/397 |
| 5,521,258 | 5/1996 | Cooper et al. | 525/397 |

FOREIGN PATENT DOCUMENTS

| | | |
|---|---|---|
| 0 327 689 A2 | 8/1989 | European Pat. Off. . |
| 0 412 832 A2 | 2/1991 | European Pat. Off. . |
| 0 592 144 A1 | 4/1994 | European Pat. Off. . |
| 0 605 197 A2 | 7/1994 | European Pat. Off. . |
| 0 732 366 A2 | 9/1996 | European Pat. Off. . |
| 0 732 368 A2 | 9/1996 | European Pat. Off. . |
| 0 755 980 A2 | 1/1997 | European Pat. Off. . |
| 44 22 652 A1 | 1/1995 | Germany . |
| 5032880 | 2/1993 | Japan . |
| WO 89/00179 | 1/1989 | WIPO . |

*Primary Examiner*—Patricia A. Short

[57] ABSTRACT

The present invention is directed to a unique poly(arylene ether)/polyetherimide composition having improved impact strength, as well as other improved mechanical and physical properties. This composition comprises: about 40 to about 90 pbw of a polyetherimide resin; about 8 to about 60 pbw of a functionalized poly(arylene ether) resin having a base titratable functionality level of at least 30 µeq/g; and about 0.2 to about 35 pbw of a copolymer of an olefin and an epoxy-functionalized monomer; and may further include catalysts, gloss improvers, stabilizers, and other additives.

55 Claims, No Drawings

POLY(ARYLENE ETHER)/POLYETHERIMIDE BLENDS AND METHODS OF MAKING THE SAME

FIELD OF THE INVENTION

The present invention relates to thermoplastic resin blends, more specifically to compatible poly(arylene ether)/polyetherimide blends and methods of making the same.

BACKGROUND

U.S. Pat. No. 4,431,779 teaches an uncompatibilized blend of poly(arylene ether), such as poly(2,6-dimethylphenylene ether); and a polyetherimide. U.S. Pat. No. 4,942,206 teaches "Blends And Copolymers of Polyetherimide And Functionalized Poly(arylene ether)" where the poly(arylene ether) comprises one or more reactive groups capable of reacting with amine groups of the polyetherimide; the polyetherimide is amine terminated polyetherimide made by using either 3.3% or 10% excess diamine in the synthesis step, producing greater than 10 microequivalents per gram ($\mu$eq/g) of amine functionality; and additionally employed is 10 parts unfunctionalized impact modifier.

Polyetherimide-poly(arylene ether) blends that exhibit resistance to elevated temperature, reduced processing temperatures, and further improvements are desired.

SUMMARY OF THE INVENTION

In one embodiment, the present invention relates to a unique thermoplastic resin composition, comprising a mixture, based on 100 pbw of the thermoplastic resin composition, of: about 40 to about 90 pbw of a polyetherimide resin; about 8 to about 60 pbw of a base titratable functionalized poly(arylene ether) resin having a base titratable functionality level of at least 30 $\mu$eq/g; and about 0.2 to about 35 pbw of a copolymer of an olefin and an epoxy-functionalized monomer.

DETAILED DESCRIPTION OF THE INVENTION

In a preferred embodiment, the thermoplastic resin composition of the present invention comprises, based on 100 pbw of the thermoplastic resin composition, a mixture of (a) about 40 to about 90 pbw, more preferably about 60 to about 70 pbw polyetherimide resin; (b) about 8 to about 60 pbw poly(arylene ether) resin, more preferably about 26 to about 40 pbw poly(arylene ether); and (c) about 0.2 to about 35 pbw, more preferably from about 0.3 to about 5 pbw of a copolymer of an olefin and an epoxy functionalized monomer, with about 1.9 to about 3 pbw especially preferred.

Polyetherimide Resins

The polyetherimide resins useful with the present invention include all those known in the art which are melt processable, such as those whose preparation and properties are described in U.S. Pat. Nos. 3,803,085 and 3,905,942, each of which is incorporated herein by reference.

Preferably, the polyetherimide resin used for preparing the blends of this invention comprises more than 1, typically from about 10 to 1000 or more, and more preferably from about 10 to about 500 structural units, of the formula (I):

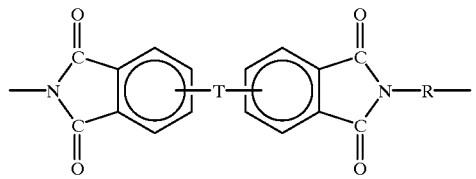

wherein T is —O— or a group of the formula —O—Z—O— wherein the divalent bonds of the —O— or the —O—Z—O— group are in the 3,3', 3,4', 4,3', or the 4,4' positions; Z includes, but is not limited to, a divalent radical of formulae (II).

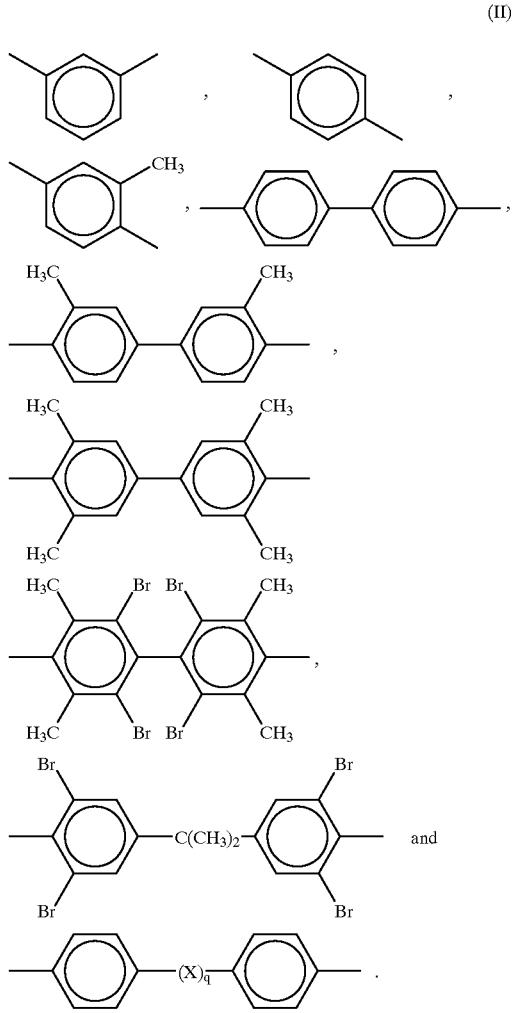

wherein X includes, but is not limited to, divalent radicals of the formulae (III):

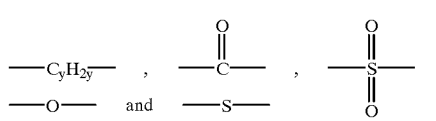

wherein y is an integer from 1 to about 5, and q is 0 or 1; R includes, but is not limited to, a divalent organic radical: (a) aromatic hydrocarbon radicals having from 6 to about 20 carbon atoms and halogenated derivatives thereof, (b) alkylene radicals having from about 2 to about 20 carbon atoms, (c) cycloalkylene radicals having from about 3 to about 20 carbon atoms, and (d) divalent radicals of the general formula (IV):

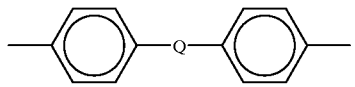

(IV)

where Q includes, but is not limited to, the formulae (V):

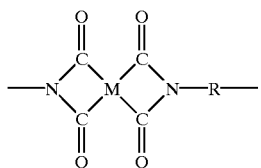

(V)

where y is an integer from about 1 to about 5.

In one embodiment, the polyetherimide may be a copolymer which, in addition to the etherimide units described above, further contains polyimide structural units of the formula (VI):

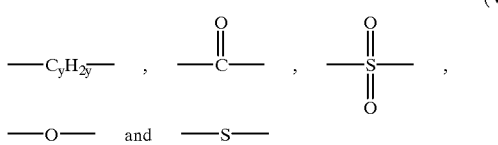

(VI)

wherein R is as previously defined for formula (I) and M includes, but is not limited to, formula (VII):

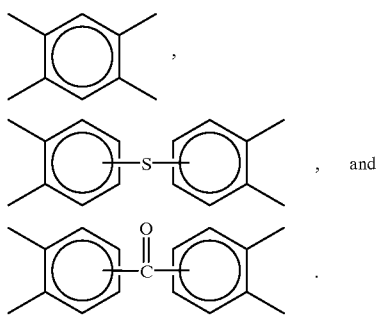

(VII)

and

The polyetherimide can be prepared by any of the methods well known to those skilled in the art, including the reaction of an aromatic bis(ether anhydride) of the formula (VIII):

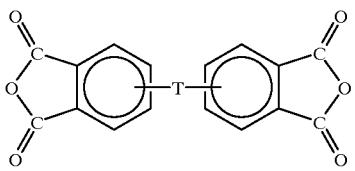

(VIII)

with an organic diamine of the formula (IX):

$$H_2N—R—NH_2 \quad (IX)$$

wherein T and R are defined as described above in formula (I). In general the reactions can be carried out employing well-known solvents, e.g., o-dichlorobenzene, m-cresol/toluene and the like to effect a reaction between the anhydride of formula (VIII) and the diamine of formula (IX), at temperatures of about 100° C. to about 250° C. Alternatively, the polyetherimide can be prepared by melt polymerization of aromatic bis(ether anhydride)s and diamines accomplished by heating a mixture of the ingredients to elevated temperatures with concurrent stirring. Generally melt polymerizations employ temperatures of about 200° C. to about 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated herein by reference.

Illustrative examples of aromatic bis(ether anhydride)s of formula (VIII) include: 2,2-bis[4-(3,4-dicarboxyphenoxy) phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

A preferred class of aromatic bis(ether anhydride)s included by formula (VIII) above includes, but is not limited to, compounds wherein T is of the formula (X):

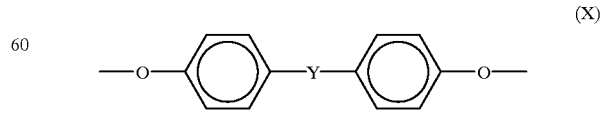

(X)

and the ether linkages, for example, are preferably in the 3,3', 3,4', 4,3', or 4,4'positions, and mixtures thereof, and where Y includes, but is not limited to the formulae (XI):

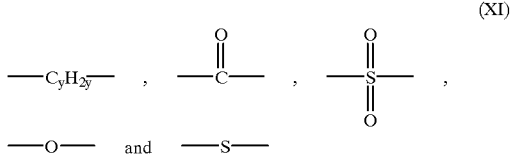

When polyetherimide/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (IX) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy)ethane; benzidine; m-xylylenediamine; 2,4-diaminotoluene; 2,6-diaminotoluene; isomeric methyl-4,6-diethyl-1,3-phenylenediamines; bis(2-chloro-4-amino-3,5-diethylphenyl)methane; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Generally, useful polyetherimides have a melt index of between 0.1 and 10 grams per minute ("g/min"), as measured by American Society for Testing Materials ("ASTM") D1238 at 295° C., using a 6.6 kilogram ("kg") weight.

In a preferred embodiment, the polyetherimide resin of the present invention resin has a weight average molecular weight (Mw) of from 10,000 to 150,000 grams per mole ("g/mole"), as measured by gel permeation chromatography, using a polystyrene standard. Such polyetherimide resins typically have an intrinsic viscosity [η] greater than about 0.2 deciliters per gram, preferably about 0.35 to about 0.7 deciliters per gram measured in m-cresol at 25° C. Some such polyetherimides include, but are not limited to Ultem 1000 (number average molecular weight (Mn) 21,000; weight average molecular weight (Mw) 54,000; dispersity 2.5), Ultem 1010 (Mn 19,000; Mw 47,000; dispersity 2.5), Ultem 1040 (Mn 12,000; Mw 34,000–35,000; dispersity 2.9), or mixtures thereof.

The polyetherimide resins of the present invention can optionally be prepared from reaction of an aromatic bis(ether anhydide) with an organic diamine in which the diamine is present in the reaction mixture at no more than about 0.2 molar excess, and preferably less than 0.2 molar excess. Under such conditions the polyetherimide resin has less than 15 μeq/ g acid titratable groups, and preferably less than about 10 μeq/ g acid titratable groups, as shown by titration with chloroform solution with a solution of 33% hydrobromic acid in glacial acetic acid. Acid-titratable groups are essentially due to amine end-groups in the polyetherimide resin.

Included among the many methods of making the polyetherimide are those disclosed in U. S. Pat. Nos. 3,847,867, 3,814,869, 3,850,885, 3,852,242, 3,855,178, 3,983,093, and 4,443,591. These patents are incorporated herein by reference for the purpose of teaching, by way of illustration, general and specific methods for preparing polyetherimide for use in the blends of this invention.

In a preferred embodiment, the polyetherimide resin comprises structural units according to formula (I) wherein each R is independently paraphenylene or metaphenylene or a mixture thereof and T is a divalent radical of the formula (XII):

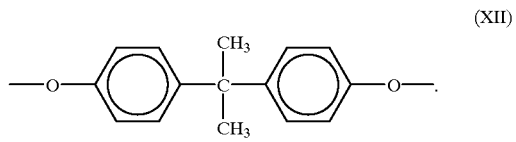

For the composition of the present invention, up to about 90 pbw of polyetherimide resin, based upon a 100 pbw composition, can be employed. Typically, about 40 pbw to about 90 pbw is preferred, with about 60 pbw to about 70 pbw especially preferred.

Poly(arylene ether)

Although all conventional poly(arylene ether)s can be employed with the present invention, polyphenylene ethers ("PPE") are preferred. Typically, up to about 60 pbw poly(arylene ether), based upon a 100 pbw composition, can be employed, with about 8 pbw to about 60 pbw preferred, and about 30 pbw to about 40 pbw especially preferred.

Poly(arylene ether)s per se, are known polymers comprising a plurality of stuctural units of the formula (I):

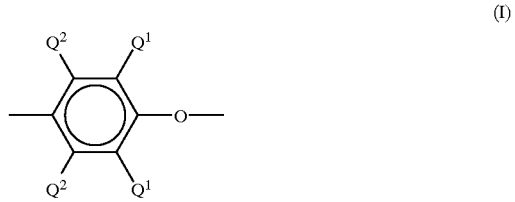

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly (arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

It will be apparent to those skilled in the art from the foregoing that the poly(arylene ether) contemplated for use in the present invention include all those presently known, irrespective of variations in structural units or ancillary chemical features.

The poly(arylene ether) generally has an intrinsic viscosity often between about 0.10–0.60 deciliters per gram (dl/g), preferably in the range of about 0.29–0.48 dl/g, all as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

Suitable base titratable functionalized poly(arylene ether) resins include, but are not limited to, those prepared via reaction with an appropriate acid or anhydride functionalization agent. For example those prepared by melt reaction of poly(arylene ether) with alpha, beta unsaturated carbonyl compounds, including maleic anhydride, maleic acid, fumaric acid, citraconic anhydride, citraconic acid, itaconic anhydride, itaconic acid, aconitic anhydride, aconitic acid, and their esters and amines; alpha-hydroxy carbonyl compounds including carboxylic acids such as citric acid and malic acid; derivatives of 5-hydroxybenzene-1,2,4-tricarboxylic anhydride, such as the 5-acetyl-derivative or a 4-ester-derivative such as the phenyl ester; trimellitic anhydride aryl esters, including trimellitic anhydride phenyl salicylate; or combinations thereof, among others conventionally known in the art, can be employed. Alternatively, poly(arylene ether) may be functionalized with acidic or latent acidic groups in a suitable solvent. Examples of such processes include metallation of poly(arylene ether) in tetrahydrofuran (THF) followed by quenching with carbon dioxide or capping of poly(arylene ether) in toluene solution with trimellitic anhydride acid chloride. Typically, up to about 10 wt % functionalization agent can be used (based on the weight of the poly phenylene ether and the agent), with up to about 6 wt % preferred, and about 1.5 wt % to about 4 wt % especially preferred.

An important aspect of this invention is the necessity of having high levels of acidic or latent acidic functionality bound to poly(arylene ether). Such functionality may be conveniently measured by titration with base, such as sodium or potassium hydroxide, or sodium or potassium alkoxide, or another conventional method, with titration with sodium alkoxide preferred, and titration with sodium ethoxide especially preferred. Titration to determine bound, base-titratable functionality levels is typically performed on functionalized poly(arylene ether) samples which have been reprecipitated from toluene with methanol to remove any free, unbound functionalization agent. Preferred levels of base titratable functionality bound to the poly(arylene ether)s for use in the compositions of this invention are at least 30 $\mu$eq/g, with from about 50 to about 500 $\mu$eq/g preferred, and about 70 to about 250 $\mu$eq/g more preferred. Base titratable functionality levels of about 80 to about 120 $\mu$eq/g are especially preferred in order to obtain composites having improved mechanical properties, such as a composition having a reverse notched Izod impact strength exceeding about 25 ft-lb/in, with a composition having reverse notched Izod impact strength exceeding about 30 ft-lb/in being especially preferred.

Compatibilizer

In addition to polyetherimide and poly(arylene ether), the composition of the present invention comprises a compatibilizer which is preferably at least one copolymer of an olefin and an epoxy functionalized monomer, preferably glycidyl acrylate, glycidyl methacrylate, or a combination thereof. The copolymer of an olefin and an epoxy functionalized monomer can be any such compound or combination of compounds which imparts impact strength to the polymer blend, and lessens the tendency of molded parts of the blend to delaminate. Typically, the copolymer of an olefin and an epoxy functionalized monomer includes, but is not limited to, epoxy-functionalized polyolefins. Some epoxy-functionalized polyolefins suitable for use in the invention include, but are not limited to, copolymers of alkenes with epoxy functionalized monomers such as poly(ethylene-co-glycidyl methacrylate). Typical poly(ethylene-co-glycidyl methacrylate)s contain about 6–12% glycidyl methacrylate (GMA). An example is a poly(ethylene-co-glycidyl methacrylate) containing about 12% GMA available from Sumitomo Chemical under the name Bondfast E or Igetabond. Other epoxy-containing polyolefins, such as ethylene-alkyl acrylate-glycidyl methacrylate terpolymers, are suitable for use provided they have sufficient thermal stability at the processing temperatures, typically around 260–340° C., used to prepare the blends of the present invention.

Typically up to about 35 pbw of the copolymer of an olefin and an epoxy-functionalized monomer, based upon a 100 pbw composition, can be employed, with about 0.3 pbw to about 5 pbw preferred, and about 1 pbw to about 3 pbw especially preferred.

Other Additives

A coupling agent such as sodium or zinc stearate or an epoxy, including, but not limited to, 3,4-epoxy cyclohexylmethyl- 3,4-epoxy cyclohexanecarboxylate, epoxidized soy bean oil, and mixtures thereof, among others, can be used to improve impact and hydrolytic resistance, tab-bending performance, and other characteristics of the molded blend.

Additionally, the thermoplastic resin composition of the present invention may optionally also contain various additives, such as antioxidants, such as, for example, organophosphites, for example, tris(nonyl-phenyl) phosphite, tris(2,4-di-t-butylphenyl)phosphite, bis(2,4-di-t-butylphenyl)pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)] methane, 3,5-di-tert-butyl-4-hydroxyhydrocinnamate octadecyl, 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, $TiO_2$, fibers, glass fibers (including continuous and chopped fibers), carbon black, graphite, calcium carbonate, talc, mica and other additives such as, for example, mold release agents, UV absorbers, stabilizers such as light stabilizers and others, lubricants, plasticizers, pigments, dyes, colorants, anti-static agents, blowing agents, flame retardants, impact modifiers, among others.

The preparation of the compositions of the present invention is normally achieved by merely blending the ingredients under conditions suitable for the formation of an intimate blend. Such conditions often include solution blending or melt mixing in single or twin screw type extruders, mixing bowl, roll, kneader, or similar mixing devices which can apply a shear to the components. Twin screw extruders are often preferred due to their more intensive mixing capability over single screw extruders. It is often advantageous to apply a vacuum to the blend through at least one vent port in the extruder to remove volatile components in the composition.

Meanwhile, the blend is preferably sufficiently heated such that the components are in the molten phase, thereby enabling intimate mixing. Typically temperatures up to about 360° C. can be employed, with about 220° C. to about 350° C. preferred, and about 260° C. to about 340° C. especially preferred.

For example, the polyetherimide, functionalized poly (arylene ether), and epoxy-functionalized polyolefin compositions can be prepared by melt compounding. One suitable process involves mixing polyetherimide with functionalized poly(arylene ether) and epoxy-functionalized polyolefin, and optionally fillers and/or other additives, and extruding the mixture to form a blend. Extrusion may be conveniently performed on a twin screw extruder equipped with a vacuum-vented barrel segment, or similar equipment. In such a process the functionalized poly(arylene ether) is prepared in a separate reaction step, either by reaction in solution or, preferably, by preextrusion with a functionalizing agent.

Alternatively, the polyetherimide and epoxy-functionalized polyolefin can be preextruded in a separate step. This polyetherimide-polyolefin extrudate is then reextruded with functionalized poly(arylene ether) and optionally additives in a second extrusion step. In yet another alternative, the functionalized poly(arylene ether) and epoxy-functionalized polyolefin can be preextruded in a separate step, after which, the poly(arylene ether)-polyolefin extrudate is then reextruded with polyetherimide and optionally additives in a second extrusion step.

Based upon economy, a most preferred process for preparing functionalized poly(arylene ether)/polyetherimide compositions by melt extrusion involves combining into a single extrusion step the poly(arylene ether) functionalization step and subsequent compounding with polyetherimide, epoxy-functionalized polyolefin, and optional additives. For example, poly(arylene ether) and an appropriate carboxylic acid/anhydride functionalization agent can be fed into a suitable screw extruder in which the temperature and mixing regime in the first few barrel segments facilitate efficient grafting of acid/anhydride functionality onto the poly (arylene ether). Polyetherimide, epoxy-functionalized polyolefin, and additives (optionally in the form of a concentrate) may be fed to the molten functionalized poly (arylene ether) stream in the same extruder at an appropriate down-stream feed port. The extruder may be optionally vacuum-vented at barrel segments before the polyetherimide feed port or after the polyetherimide feed port or at both locations. Optionally, a portion of the polyetherimide and/or additives may be throat-fed with the poly(arylene ether) and functionalizaton agent.

The composition of the present invention can be molded into useful articles, such as, for example, heat resistant containers, by a variety of means such as, for example, injection molding, compression molding, thermoforming, and blow molding, among others conventionally known in the art.

EXAMPLES

The samples set forth in the Tables below were prepared by combining the following components:

| | |
|---|---|
| AOE | Acrylate orthoester synthesized by reaction of acryloyl chloride with 4-hydroxymethyl-2-methoxy-2-methyl-1,3-dioxolane in the presence of base; |
| Arkon | A fully saturated alicyclic hydrocarbon resin with a softening point of 140° C. and Mw 860 (commercially available from Arakawa Chemical USA, Chicago, Illinois); |
| Benzoflex | Benzoflex S-552 is a pentaerythritol tetrabenzoate ester plasticizer (commercially available from Velsicol Chemical Corp., Rosemont, Illinois); |
| Bondfast E | poly(ethylene-co-glycidyl methacrylate) containing 12% glycidyl methacrylate (available from Sumitomo Chemical Co., Japan); |
| CA | Citric acid; |
| Clearon | A hydrogenated polyterpene resin with a glass transition temperature of 68° C. and Mn 700 (commercially available from Aceto Corp., Lake Success, New York); |
| ERL | 3,4-epoxy cyclohexylmethyl-3,4-epoxy cyclohexanecarboxylate (available from Bakelite ERL 4221, Union Carbide, Danbury, CT); |
| FA | Fumaric acid; |
| Irganox ™ 1010 | Tetrakis[methylene(3,5-di-tert-butyl-4-hydroxyhydrocinnamate)] methane (available from Ciba, Tarrytown, NY); |
| NaSt | Sodium stearate (available from Witco Chemical Co., Edicott, NY); |
| PA6-A | Polyamide 6 grade (Capron 1250) with Mn 25,000 and amine end-group concentration of 79 micro eq/g (available from Allied Signal Engineered Plastics, Morristown, NJ); |
| PA6-B | Polyamide 6 grade (Ube 8020A) with Mn 19,600 and amine end-group concentration of 120 micro eq/g (available from Unitika, Japan); |
| PA12 | Polyamide 12 grade (Rilsan ® A available from Elf Atochem North America, Philadelphia, PA); |
| PEI-1000 | Polyetherimide resin made by condensation of 2,2-bis[4-(3,4-dicarboxyphenoxy)phenyl]propane dianhydride with metaphenylene diamine and having a melt index of 0.9 g/min at 337° C. (Ultem ® 1000 available from General Electric Plastics, Pittsfield, MA); |
| PEI-1010 | Polyetherimide resin made by condensation of 2,2-bis[4-(3,4-dicarboxyphenoxy)phenyl]propane dianhydride with metaphenylene diamine and having a melt index of 1.8 g/min at 337° C. (Ultem ® 1010 available from General Electric Plastics, Pittsfield, MA); |
| PEI-1040 | Polyetherimide resin made by condensation of 2,2-bis[4-(3,4-dicarboxyphenoxy)phenyl]propane dianhydride with metaphenylene diamine and having a melt index of about 4.6 g/min at 337° C. (Ultem ® 1040 available from General Electric Plastics, Pittsfield, MA); |
| PEN | Polyethylene naphthalate grade VFR40001X having an intrinsic viscosity of 0.60 (available from Shell Chemical Company, Houston, TX); |
| PET | Poly(ethylene terephthalate) resin having an intrinsic viscosity of 0.57 (5202A available from ICI, Fayetteville, NC); |
| PPE | Poly(phenylene oxide) (PPO ™ available from General Electric Plastics, Pittsfield, MA); |

-continued

| | |
|---|---|
| PPE-p | Pellets of vacuum vented extrudate derived from 0.40 IV PPE; |
| SF1706 | Amino-functionalized silicone fluid (available from General Electric Silicones, Waterford, NY); |
| TAAC | Trimellitic anhydride acid chloride; and |
| UV9315 | Epoxy-functionalized silicone fluid (available from General Electric Silicones, Waterford, NY). |

"A" Processing Conditions:

Extrusions were performed on a Werner & Pfleiderer 28 millimeter (mm) twin screw extruder at 320 revolutions per minute (rpm). All extrudates were quenched in water, pelletized, and dried in a circulating air oven at 100–110° C. before molding into test parts.

Extruder functionalized poly(arylene ether)s were prepared by mixing poly(arylene ether) with specified levels of functionalization agent (as expressed in weight percent (wt %) based on poly(arylene ether)) in a Henshel mixer and extruding the mixture with vacuum venting using barrel set temperatures of 260° C. (feed throat), 320° C., 320° C., 320° C., 320° C., and 320° C. Functionalized poly(arylene ether)s were characterized by titration with sodium ethoxide for quantitation of base-titratable species. Both extrudate and reprecipitated samples were titrated. Reprecipitation was performed by dissolution of extrudate in toluene (10–20% weight per volume (wt/vol) concentration) and precipitation with methanol. Reprecipitated material was dried in a vacuum oven at 100–110° C. overnight before titration.

Blends of polyetherimide, functionalized poly(arylene ether) and epoxy-functionalized polyolefin (whether all throat fed or using a concentrate of two of the components) and polyetherimide—epoxy-functionalized polyolefin binary blends were extruded with vacuum venting using barrel set temperatures 260° C. (feed throat), 320° C., 320° C., 320° C., 320° C., and 320° C.

Glass filled blends of polyetherimide, functionalized poly (arylene ether) and epoxy-functionalized polyolefin were extruded with vacuum venting using barrel set temperatures 280° C. (feed throat), 320° C., 320° C., 320° C., 320° C. and 330° C.

Pellets were dried at 250° F./125° C. for 4–6 hours (hrs) (1 hour for poly(arylene ether) pellets) before molding or testing. Pellets were tested for melt index rate at 337° C./6.6 kgf (ASTM D1238). Molded test parts not containing glass were prepared on an Engel 30 ton molding machine at barrel set temperatures 315° C., 338° C., 338° C., 338° C., mold set temperature 135° F., and cycle time 25 seconds. Molded test parts containing glass were prepared on an Engel 30 ton molding machine at barrel set temperatures 327° C., 343° C., 343° C., 343° C., mold set temperature 149° C., and cycle time 38 seconds. Molded parts were tested for notched and unnotched Izod impact values as per ASTM D256. Tensile properties were determined as per ASTM D638 using large tensile bars.

"B" Processing Conditions:

Extrusions were performed on either a 30 mm or 40 mm twin screw extruder at 300–400 rpm for unfilled blends, or on a 2.5 inch Egan single screw extruder with or without side-feeder at 100 rpm for glass filled blends. All extrudates were quenched in water, pelletized, and dried in a circulating air oven at 121° C. for 4 hrs. before molding into test parts.

Extruder functionalized poly(arylene ether)s were prepared by mixing poly(arylene ether) with specified levels of functionalization agent and extruding the mixture with vacuum venting using barrel set temperatures 260–300° C. Functionalized poly(arylene ether)s were characterized pursuant to "A" processing conditions as mentioned above.

Blends of polyetherimide, functionalized poly(arylene ether) and epoxy-functionalized polyolefin (whether all throat fed or using a concentrate of two of the components) were extruded with vacuum venting using barrel set temperatures 293–327° C.

Glass-filled blends of polyetherimide, functionalized poly (arylene ether), with or without epoxy-functionalized polyolefin were extruded with vacuum venting using barrel set temperatures 304–338° C.

Pellets were dried as in process "A" and were tested for melt index rate at 337° C./6.6 kgf (ASTM D1238). Molded test parts were prepared on a Newbury 150 ton molding machine at barrel set temperatures 327–350° C. for unfilled and 338–360° C. for glass filled, mold set temperature 135° C., and cycle time 25 seconds. Molded parts were tested for specific gravity (ASTM D792), notched and unnotched Izod impact values, tensile and flexile properties (ASTM D638 and ASTM D790), HDT (ASTM D648).

Results of the testing are set forth below in the Tables as follows: heat deflection temperature ("HDT"), expressed in degrees centigrade ("°C."); yellowness index ("YI"); tensile strength at yield, tensile strength at break and tensile modulus, each expressed in kilo-pounds per square inch ("kpsi"); tensile elongation expressed as a percentage ("%") of original specimen length; flexural strength and flexural modulus, each expressed in kpsi; notched Izod impact and reverse notched Izod impact, each expressed in foot-pounds per inch ("ft-lb/in"); specific gravity and dart impact, expressed in foot-pounds ("ft-lb"); and melt index at 337° C., expressed in grams per minute ("g/min").

Table 1 shows baseline properties for uncompatiblized PEI/PPE blends at different ratios. PPE-p is vacuum vented extrudate from 0.40 IV PPE powder. The blends (PEI/PPE= 100/0, 70/30, 50/50, 30/70 and 0/100) were extruded under the same conditions as for blending of PEI 1010 and PPE-p at the desired ratio.

TABLE 1

| | PEI/PPE Ratio | | | | | | |
|---|---|---|---|---|---|---|---|
| | 100/0 | 70/30 | 50/50 | 30/70 | 0/100 | PEI 1010 pellet | PPE-p |
| | Sample Nos. | | | | | | |
| Properties | 1 | 2 | 3 | 4 | 5 | 6 | 7 |
| Melt Index @ 337° C. | 1.72 | 1.25 | 0.76 | 0.75 | 0.38 | 1.8 | 1.97 |
| HDT @ 264 psi (° C.) | 203 | 198 | 196 | 196 | 194 | 202 | 192 |
| Notched Izod (ft-lb/in) | 0.7 | 0.5 | 1.1 | 0.8 | 1 | 0.6 | 1.1 |
| Reverse N.I. (ft-lb/in) | 14.9 | 8 | 7.4 | 7.7 | 39.9 | 19.6 | 39.9 |
| Tensile Strength @ Break (psi) | 15,900 | 14,000 | 13,000 | 12,000 | 10,900 | 16,200 | 10,800 |
| Tensile (%) | 19.8 | 29 | 5.1 | 6.6 | 49 | 38 | 55 |
| Tensile Modulus (psi) | 504,000 | 432,000 | 456,000 | 403,000 | 372,000 | 516,000 | 379,000 |
| Flexural Strength (psi) | 23,600 | 21,400 | 19,800 | 18,200 | 17,100 | 23,500 | 16,400 |
| Flexural Modulus (psi) | 522,000 | 483,000 | 475,000 | 426,000 | 418,000 | 527,000 | 402,000 |
| Specific Gravity | 1.28 | 1.22 | 1.17 | 1.13 | 1.07 | 1.28 | |

Most properties of the blends fell between those of PEI and PPE, except that the impact strengths of the blends were lower than either PEI or PPE, and they showed some degree of delamination, indicating the need for compatibilization.

Table 2 illustrates levels of total base-titratable functionality and bound base-titratable functionality (following precipitation) for various functionalized PPE samples used in the blends of the following tables.

TABLE 2

| | Sample Nos./wt % Functionalizing Agent | | | | | | | | |
|---|---|---|---|---|---|---|---|---|---|
| Properties | 8 0.46 IV control | 9 0.7% CA | 10 1.4% CA | 11 3% CA | 12 4% CA | 13 2% FA | 14 3% FA | 15 4% FA | 16 6% FA |
| Mol % | — | 0.004 | 0.008 | 0.0156 | 0.0208 | 0.0172 | 0.0258[a] | 0.0345 | 0.0517 |
| Extrudate Pellets μeq/g | 3.7 | 24 | 44 | 53 | 42 | 76 | — | 136 | 153 |
| Reprecipitated μeq/g | 4.0 | 17 | 28 | 31 | 30 | 64 | 79 | 101 | 112 |

[a]sample prepared on 40 mm extruder

The data show that substantially higher levels of base titratable functionality are bound to PPE functionalized with comparable weight loading of fumaric acid compared to citric acid.

The compositions of Table 3 were prepared according to the "A" processing conditions by pre-extruding PEI 1010 with Bondfast E to produce a concentrate comprising 2.85 wt % Bondfast E, and reextruding this concentrate with different PPEs. The PPEs had been prepared by extrusion of 0.46 intrinsic viscosity (IV). PPE with a functionalization agent in a separate extrusion step (except for the PPE-TAAC which was made in toluene solution). All final compositions contained 2 wt % Bondfast.

TABLE 3

| | Sample Nos. | | | | | | | | | |
|---|---|---|---|---|---|---|---|---|---|---|
| Properties | 17 | 18 | 19 | 20 | 21 | 22 | 23 | 24 | 25 | 26 |
| PPE Type | Powder | PPE-p | -TAAC | 0.7% CA | 1.4% CA | 3.0% CA | 4.0% CA | 2.0% FA | 4.0% FA | 2.6% AOE |

TABLE 3-continued

| Properties | Sample Nos. | | | | | | | | | |
|---|---|---|---|---|---|---|---|---|---|---|
| | 17 | 18 | 19 | 20 | 21 | 22 | 23 | 24 | 25 | 26 |
| Melt Index @ 337° C. | 1.86 | 1.77 | 0.84 | 1.42 | 1.27 | 1.36 | 0.91 | 0.88 | 1.06 | 0.10 |
| Tensile Strength @ break (psi) | 10,600 | 9,700 | 10,200 | 12,200 | 10,600 | 12,000 | 12,900 | 10,900 | 11,300 | 11,100 |
| Tensile Elongation | 3.6% | 2.8% | 3.8% | 4.9% | 10.4% | 4.4% | 7.5% | 6.0% | 76.0% | 4.2% |
| Tensile Modulus (psi) | 413,000 | 434,000 | 362,000 | 460,000 | 453,000 | 458,000 | 408,000 | 364,000 | 413,000 | 361,000 |
| Notched Izod (ft-lb/in) | — | — | 0.7 | — | 0.5 | — | 0.3 | 0.8 | 0.8 | 0.8 |
| Reverse N.I.[a] (ft-lb/in) | 6.3 | 10.1 | 27.4 | 10.4 | 11.3 | 11.0 | 8.6 | 34.4 | 37.0 | 6.4 |
| [b]Relative Delamination | 3 | 3 | 3 | 2 | 2 | 2 | 2 | 2 | 1–2 | 4 |

[a]N.I. is Notched Izod.
[b]Relative delamination determined by breaking large tensile bar (1 = best; 5 = worst).

The data set forth in Table 3 show that poor reverse notched Izod impact strength and tensile elongation are obtained in blends containing unfunctionalized PPE (Samples 17 and 18) or non-acid containing poly(arylene ether)-g-acrylate ortho ester (Sample 26).

Improved blend properties are obtained when functionalized poly(arylene ether) is used in the blends as had been disclosed previously (Sample 19). However, there is a dramatic improvement in blend mechanical properties; specifically, tensile elongation and reverse notched Izod impact strength when the highly functionalized PPEs made with 2% FA or 4% FA are used (Samples 24 and 25). Sample 24 exhibited an extrudate pellets functionality level of 76 μeq/g and a reprecipitate functionality level of 64 μeq/g, while Sample 25 exhibited an extrudate pellets functionality level of 136 μeq/g and a reprecipitate functionality level of 101 μeq/g. However, there is some decrease in flow compared to control blends.

The key observation is that blend mechanical properties shown in Table 3 improve with increasing levels of base-titratable functionality bound to the PPE. Especially attractive mechanical properties are obtained in blends when the level of base-titratable functionality bound to PPE (i.e. the level in reprecipitated samples) is higher than about 50 μeq/g.

Table 4 shows properties for glass filled PEI/PPE/Bondfast E blends. PEI-1010 and glass were preextruded to make a concentrate containing 40 wt % glass. Then, this concentrate was extruded with PPE and Bondfast. Again, functionalized PPEs were prepared by extrusion of 0.40 IV PPE with 2.0% FA functionalization agent in a separate extrusion step.

TABLE 4

| Properties | Sample Nos. | | | |
|---|---|---|---|---|
| | 27 | 28 | 29 | 30[c] |
| PPE:PPE Bondfast:glass | 47:20:2:31 | 47:20:2:31 | 45:19:5:30 | 48:20:0:32 |
| Melt Index | 0.58 | 0.59 | 0.17 | 0.78 |

TABLE 4-continued

| Properties | Sample Nos. | | | |
|---|---|---|---|---|
| | 27 | 28 | 29 | 30[c] |
| @ 337° C. | | | | |
| Tensile Strength @ Break (psi) | 15,200 | 15,000 | 13,500 | 14,400 |
| Tensile Elongation (%) | 2.3 | 2.4 | 2.7 | 2.0 |
| Tensile Modulus (psi) | 1,000,000 | 968,000 | 815,000 | 979,000 |
| Notched Izod (ft-lb/in) | 0.8 | 0.7 | 0.7 | 0.8 |
| Reverse N.I. (ft-lb/in) | 4.7 | 3.4 | 3.6 | 3.6 |

[a]Relative delamination tendency determined by breaking large tensile bar (1= best; 5 = worst).
[b]Ultem-glass concentrate dried before blending.
[c]blend contains no Bondfast.

As is supported by Table 4, adding glass to these blends greatly increases the tensile modulus while decreasing the tensile elongation and reverse notched Izod impact properties.

Furthermore, the blend flow is largely controlled by the level of Bondfast present. Sample 30, which has no Bondfast, has the highest flow. In comparison, Samples 27 and 28 with 2 wt % Bondfast, have decreased flow and Sample 29, with 5 wt % Bondfast, has the poorest flow.

Table 5 shows properties for PEI/PPE/Bondfast E compositions containing additives for gloss improvement. High gloss (greater than a 60 value measured at 20° angle) is important to insure adequate metallization of a molded part surface such as an automotive head lamp reflector.

All blends were made by throat-feeding all of the ingredients simultaneously to make a final blend composition of 29 wt % PPE, 69 wt % PEI, 2 wt % Bondfast E, and various additive levels. All functionalized PPEs were prepared by extrusion of 0.40 IV PPE with functionalization agent in a separate extrusion step.

TABLE 5

| Properties | Sample Nos. | | | | | | | |
| --- | --- | --- | --- | --- | --- | --- | --- | --- |
| | 31 | 32 | 33 | 34 | 35 | 36 | 37 | 38 |
| Additive (phr) | None | SF1706 (0.08) | SF1706 (0.17) | SF1706 (0.25) | SF1706 (0.50) | SF1706 (0.75) | SF1706 (1.0) | UV9315 (0.25) |
| 20° Gloss | 38 | 64 | 41 | 81 | 72 | 51 | 31 | 71 |
| Melt Index @ 337° C. | 1.56 | 1.36 | 1.20 | 1.99 | 2.01 | 1.68 | 1.72 | 1.88 |
| Tensile Strength @ break (psi) | 9,770 | 12,500 | 10,600 | 10,200 | 10,700 | 10,900 | 10,500 | 10,100 |
| Tensile Elongation | 46% | 53% | 33% | 38% | 72% | 37% | 46% | 48% |
| Tensile Modulus (psi) | 410,000 | 409,000 | 445,000 | 449,000 | 465,000 | 451,000 | 444,000 | 426,000 |
| Notched Izod (ft-lb/in) | 1.0 | 1.0 | 1.0 | 1.1 | 0.5 | 0.9 | 0.6 | 0.8 |
| Reverse N.I. (ft-lb/in) | 24.1 | 38.6 | 34.5 | 15.5 | 21.5 | 35.0 | 17.5 | 14.5 |
| Relative Delamination[a] | 2 | 2 | 2 | 2–3 | 3 | 2–3 | 3 | 3 |

| Properties | Sample Nos. | | | | | | | |
| --- | --- | --- | --- | --- | --- | --- | --- | --- |
| | 39 | 40 | 41 | 42 | 43 | 44 | 45 | 46 | 47 |
| Additive (phr) | UV9315 (0.17) | PA12 (0.31) | PA12 (0.49) | PET (0.50) | PET (1.0) | PEN (0.50) | PEN (1.0) | PA6 A (1.0) | PA6 B (1.0) |
| 20° Gloss | 61 | 62 | 79 | 72 | 65 | 63 | 52 | 51 | 47 |
| Melt Index @ 337° C. | 1.20 | 1.41 | 1.66 | 1.64 | 1.66 | 1.52 | 1.61 | 1.65 | 1.82 |
| Tensile Strength @ break (psi) | 11,500 | 22,100 | 11,700 | 11,000 | 12,200 | 10,500 | 10,700 | 11,200 | 10,000 |
| Tensile Elongation | 64% | 72% | 44% | 62% | 83% | 45% | 53% | 47% | 61% |
| Tensile Modulus (psi) | 391,000 | 405,000 | 460,000 | 454,000 | 456,000 | 484,000 | 469,000 | 458,000 | 443,000 |
| N.I. (ft/lb/in) | 1.2 | 1.0 | 0.6 | 0.9 | 1.0 | 1.0 | 1.0 | 0.4 | 1.3 |
| Reverse N.I. (ft-lb/in) | 32.4 | 30.9 | 29.8 | 34.1 | 40.3 | 35.7 | 31.2 | 12.5 | 13.6 |
| [a]Relative Delamination | 2–3 | 2–3 | 2–3 | 2–3 | 2–3 | 2–3 | 2–3 | 3 | 3 |

[a]Relative delamination tendency determined by breaking large tensile bar (1 = best; 5 = worst).

Improved gloss and flow values were obtained with addition of about 0.5 parts per hundred resin (phr) or less of amino-functionalized silicone fluid, while the addition of about 0.75 phr or more of amino-functionalized silicone fluid resulted in a decrease in gloss value until at 1.0 phr the gloss value was similar to a control with no additive. Additionally, although gloss and flow values improved with addition of only 0.25 phr epoxy-functionalized silicone fluid, molded part delamination was more pronounced. Improvement in gloss values were also obtained with addition of 0.5 to 1.0 phr of PET or about 0.5 phr or less of PA12, with little improvement observed when either grades of PA6-A or PA6-B, or 0.5 to 1.0 phr PEN were added. Flow also improves slightly, while mechanical properties were mostly unaffected. Molded parts from blends containing 0.25 phr amino-functionalized silicone fluid, 0.50 phr PET, and 0.49 phr PA12 gave the best surface in a molded part subjected to metallization with aluminum in a vacuum chamber. Consequently, employing less than about 1.5 phr is preferred, with less than about 0.75 phr more preferred, and about 0.20 phr to about 0.60 phr especially preferred, of a functionalized silicone fluid, PET, PEN, polyamide, or combination thereof, with the addition of an amino-functionalized silicone fluid especially preferred.

Table 6 shows properties for PEI/PPE/Bondfast E blends containing metal catalysts and PPE-2 wt % FA prepared under "A" processing conditions. Catalysts (sodium stearate or zinc stearate) were added in attempts to improve blend properties when a PPE with lower than optimum level of functionalization was used in the blends. All blends were made by throat-feeding all of the ingredients simultaneously to make a final blend composition of 29 wt % PPE, 69 wt % PEI, 2 wt % Bondfast, and various additive levels. All functionalized PPEs had been prepared by extrusion of 0.40 IV PPE with functionalization agent in a separate extrusion step.

TABLE 6

| Properties | Sample Nos. | | | | |
|---|---|---|---|---|---|
| | 48 | 49 | 50 | 51 | 52 |
| Catalyst (phr)[a] | — | NaSt (0.009) | NaSt (0.034) | ZnSt (0.009) | Znst (0.034) |
| Melt Index @ 337° C. | 0.88 | 1.17 | 1.16 | 1.17 | 1.32 |
| Tensile Strength @ break (psi) | 10,900 | 11,300 | 11,600 | 12,700 | 12,700 |
| Tensile Elongation | 6% | 4% | 31% | 53% | 97% |
| Tensile Modulus (psi) | 364,000 | 432,000 | 419,000 | 428,000 | 431,000 |
| Notched Izod (ft-lb/in) | 0.8 | 0.6 | 0.8 | 1.5 | 0.7 |
| Reverse N.I. (ft-lb/in) | 34.4 | 22.5 | 23.2 | 39.9 | 25.2 |
| [b]Relative Delamination | 2 | 2–3 | 2–3 | 2 | 2–3 |

[a]All blends contain 0.42 phr Emery 3008 fluid (hydrogenated poly-alpha-olefin).
[b] Relative delamination determined by breaking large tensile bar (1 = best; 5 = worst).

Table 6 shows that the addition of trace catalyst levels results in a small improvement in flow, a significant improvement in tensile strength, elongation, and modulus, and little change in Izod impact properties (except for addition of 0.009 phr zinc stearate, which shows an improvement in Izod impact strength). Consequently, the addition of up to about 0.05 phr or more metal catalyst, such as sodium stearate, zinc stearate, or combinations thereof, can be employed, with about 0.005 to about 0.01 phr preferred.

Table 7 shows the results of experiments to improve the melt index by adding stabilizer (Irganox 1010) or using low molecular weight PPE or PEI.

TABLE 7

| | Sample Nos. | | | | | | | |
|---|---|---|---|---|---|---|---|---|
| | 53 | 54 | 55 | 56 | 57 | 58 | 59 | 60 |
| Composition | | | | | | | | |
| PEI 1010 | 68.00 | 68.00 | 68.00 | 54.00 | 40.00 | 34.00 | 54.00 | 53.50 |
| PEI 1040 | — | — | — | 14.00 | 28.00 | 24.00 | 14.00 | 14.00 |
| PPE-4% FA (0.46 IV) | 30.00 | — | — | — | — | — | — | — |
| PPE-4% FA (0.40 IV) | — | 30.00 | — | 30.00 | 30.00 | 40.00 | 30.00 | 30.00 |
| PPE-4% FA (0.30 IV) | — | — | 30.00 | — | — | — | — | — |
| Bondfast E | 2.00 | 2.00 | 2.00 | 2.00 | 2.00 | 2.00 | 2.00 | 2.00 |
| Irganox 1010 | — | — | — | — | — | — | — | 0.50 |
| Properties | | | | | | | | |
| Melt Index @ 337° C., g/min | 1.16 | 1.23 | 1.37 | 1.54 | 1.9 | 1.73 | 1.44 | 1.58 |
| HDT (° C.) @ 264 psi | 198 | 196 | 192 | 197 | 198 | 196 | 196 | 195 |
| Tensile Strength (psi) | 12,800 | 13,530 | — | 13,600 | 13,000 | 12,600 | 12,500 | 12,800 |
| Tensile @ Break (psi) | 10,700 | 11,830 | 6,647 | 10,900 | 10,900 | 10,900 | 10,500 | 10,500 |
| Tensile Elongation (%) | 42 | 30 | 1.5 | 35 | 72 | 72 | 38 | 42 |
| Tensile Modulus (psi) | 389,000 | 393,000 | 457,000 | 441,000 | 368,000 | 336,000 | 397,000 | 392,000 |
| Flexural Strength (psi) | 19,800 | 20,800 | 20,800 | 20,900 | 19,700 | 19,400 | 19,200 | 19,700 |
| Flexural Modulus (psi) | 454,000 | 486,000 | 494,000 | 487,000 | 452,000 | 440,000 | 463,000 | 463,000 |
| Specific Gravity | 1.2 | 1.19 | 1.2 | 1.19 | 1.19 | 1.17 | 1.2 | 1.21 |
| Notched Izod (ft-lb/in) | 1.2 | 0.7 | 0.5 | 0.8 | 0.6 | 0.6 | 0.8 | 0.9 |
| Reverse N.I. (ft-lb/in) | 32.4 | 32.2 | 11.9 | 19.3 | 16.1 | 17.6 | 17.3 | 12 |

Lower molecular weight PPE seems to improve melt index of the blends. For 0.40 IV PPE, the properties are maintained (Sample 54), while for 0.30 IV PPE, the elongation and impact strength are significantly lower (Sample 55).

Addition of PEI 1040 results in: dramatic improvement of melt index (Samples 56 and 57), while most properties are maintained even at a loading of PEI 1010/PEI 1040=60/40; and good melt index even at 40% PPE level (Sample 58); while the addition of stabilizer (Irganox 1010) results in improvement of the melt index (Samples 59 and 60).

Table 8 establishes that, with proper formulation, compounding technology, and processing conditions, knitline strength for glass filled blends can be improved while substantially maintaining most of the other properties. Glass filled compositions were prepared on either a single or twin screw extruder. The compositions employed in this example include: PPE-p, vacuum vented PPE extrudate from 0.40 IV PPE powder; PPE-CA, citric acid functionalized PPE (0.5–6% CA and 0.40 IV PPE powder) with about 20 μeq/g bound base-titratable functionality; PPE-FA, fumaric acid functionalized PPE (1.5–5% FA and 0.40 IV PPE powder) with 30–120 μeq/g bonded base-titratable functionality; and no PPE, glass filled PEI without any PPE.

with smaller PPE domain size (Sample 63: 1.4 microns average domain size) and also provides higher knitline strength, where knitline strength defines the strength at the juncture of the weld line and flow line. Knitline strength was determined using double gated tensile bars. Due to the double gated formation technique, the bars contained a knitline. These bars where subjected to various tests, including double gated tensile testing. Knitline strength is further improved with the use of a twin screw extruder over a single screw extruder (63 vs. 65) and use of PPE-FA over PPE-p (63 vs. 61 or 65 vs. 66). Preferably, the knitline strength, measured using double gated tensile testing, exceeds about 5,000 psi, with a knitline strength exceeding about 7,500 psi especially preferred.

Table 9 addresses the advantages obtained employing mold release agent and/or catalyst, including improved processability and surface gloss. These compositions can be prepared on a 30 mm or 40 mm twin screw extruder under

TABLE 8

| Properties | Sample Nos. | | | | | | |
|---|---|---|---|---|---|---|---|
| | 61 | 62 | 63 | 64 | 65 | 66 | 67 |
| PPE Type | PPE-p | PPE-CA | PPE-FA | NO PPE | PPE-FA | PPE-p | NO PPE |
| Extruder | Twin | Twin | Twin | Twin | Single | Single | Single |
| HDT (° C.) | 209 | 209 | 208 | 212 | 210 | 209 | 212 |
| Tensile Strength @ Break (psi) | 20,600 | 21,100 | 18,200 | 24,900 | 16,000 | 15,800 | 22,700 |
| Tensile Elongation (%) | 1.6 | 1.7 | 1.4 | 2.7 | 1.6 | 1.4 | 3.2 |
| Tensile Modulus (kpsi) | 1,540 | 1,500 | 1,500 | 1,252 | 1,290 | 1,280 | 1,250 |
| Flexure Strength (psi) | 28,100 | 30,100 | 23,600 | 38,400 | 23,400 | 26,000 | 32,400 |
| Flexure Modulus (kpsi) | 1,450 | 1,460 | 1,350 | 1,600 | 1,260 | 1,240 | 1,260 |
| Notched Izod (ft-lb/in) | 1.8 | 1.3 | 0.8 | 2.0 | 0.8 | 0.8 | 1.3 |
| Reverse N.I. (ft-lb/in) | 4.5 | 4.9 | 3.2 | 11 | 3.4 | 4.1 | 8.1 |
| Dynatup (ft-lb) | 2.4 | 2.3 | 3.9 | 9.7 | 3.6 | 1.9 | 3.9 |
| Domain[a] | 3.5 | 2.8 | 1.4 | NA | 1.6 | 2.3 | NA |
| Tensile Strength @ Break (psi)[b] | 4,900 | 5,100 | 9,700 | — | 5,240 | 4,030 | — |
| Tensile Elongation (%)[b] | 0.4 | 0.4 | 0.7 | 1.1 | 0.4 | 0.3 | 1.3 |

[a]PPE domain size in micron from scanning electron microscopy (SEM).
[b]with double gated tensile bars.

As is shown in Table 8, replacing 20% of PEI with PPE maintains the majority of the properties; and provides blends "B" processing conditions with either all throat-fed or side-fed and/or Bondfast E.

TABLE 9

| Properties | Sample Nos. | | | | | | |
|---|---|---|---|---|---|---|---|
| | 68 | 69 | 70 | 71 | 72 | 73 | 74 |
| Additive | Ctrl (no additive) | 1% TiO$_2$ | 0.5% TiO$_2$ | 0.1% Znst | 0.05% ZnSt | 0.25% Uniplex413 | 0.25% PETS |
| Melt Index (g/min) 337° C. | 1.20 | 1.21 | 1.20 | 1.42 | 1.36 | 1.26 | 0.98 |
| HDT (° C.) | 197 | 200 | 199 | 200 | 200 | 198 | 198 |
| Tensile Strength (%) | — | — | 13.2 | 13.2 | 13.2 | 13.3 | 13.2 |
| Tensile Strength @ Break (kpsi) | 10.4 | 11.6 | 11.8 | 11.4 | 11.8 | 13.7 | 13.9 |
| Tensile Elongation (%) | 4 | 5 | 86 | 39 | 90 | 113 | 120 |
| Tensile Modulus (kpsi) | 392 | 460 | 427 | 427 | 413 | 412 | 394 |

TABLE 9-continued

|  | Sample Nos. | | | | | | |
| --- | --- | --- | --- | --- | --- | --- | --- |
| Properties | 68 | 69 | 70 | 71 | 72 | 73 | 74 |
| Flexure Strength (kpsi) | 20.2 | 21.2 | 21.4 | 22.2 | 20.3 | 20.1 | 20.1 |
| Flexure Modulus (kpsi) | 458 | 508 | 511 | 505 | 477 | 465 | 459 |
| Reverse N.I. (ft-lb/in) | 11.4 | 14.6 | 14.7 | 11.3 | 13.4 | 15.0 | 19.6 |
| Gloss (4 inch disc at 20°) | 14 | 15 | 30 | 19 | 22 | 26 | 26 |

As is shown in Table 9, the utilization of a mold release agent or catalyst improves processability, surface gloss, impact, elongation, and heat deformation temperature, while maintaining most of the other properties.

Blends containing a small amount of mold release agent and/or catalyst exhibit improved surface gloss, elongation, and impact, while blends with zinc stearate further exhibit improvements in melt index and heat deflection temperature.

Possible mold release agents are pentaerythritol tetrastearate, p-tallow-toluenesulfonamide (Uniplex 413 available from Unitex Chemical Co. Greensboro, N.C.) among others and combinations thereof, in amounts up to about 1 wt %, with about 0.1 wt % to about 0.5 wt % preferred. Possible catalysts include titanium dioxide, sodium or zinc stearate, among others and combinations thereof, in amounts up to about 0.2 wt %, with about 0.01 wt % to about 0.2 wt % preferred.

Table 10 establishes properties for PFI/PPE/Bondfast blends containing flow promoters. As designated in Table 10, some of these blends were prepared by preextruding PEI 1010 with Bondfast E to make a concentrate containing 2.85 wt % Bondfast, and reextruding this concentrate with additional PEI 1010, functionalized PPE and flow promoter to make a final blend composition of 29 wt % PPE, 69 wt % PEI, 2 wt % Bondfast, and various flow promoter levels. The remaining blends were made by throat-feeding all of the ingredients simultaneously. All functionalized PPEs had been prepared by extrusion of 0.40 IV PPE with functionalization agent in a separate extrusion step.

TABLE 10

|  | Sample Nos. | | | | | | | | | | |
| --- | --- | --- | --- | --- | --- | --- | --- | --- | --- | --- | --- |
| Properties | 75 | 76[b] | 77[b] | 78[c] | 79[c] | 80[b] | 81[b] | 82[b] | 83[c] | 84[c] | 85[b] | 86[b] |
| Flow Promotor | none | Arkon P-140 | Arkon P-140 | Arkon P-140 | Arkon P-140 | C[a] P-125 | C[a] P-125 | C[a] P-125 | C[a] P-125 | C[a] P-125 | Benzo-flex | Benzo-flex |
| Promoter Level (phr) | — | 1 | 2 | 3 | 5 | 1 | 2 | 3 | 3 | 5 | 3 | 5 |
| Melt Index @ 337° C. g/min. | 1.28 | 1.46 | 1.58 | 1.56 | 1.66 | 1.55 | 1.72 | 1.59 | 1.84 | 2.37 | 1.84 | 2.48 |
| Tensile Strength @ break (kpsi) | 10.8 | 9.15 | 10.4 | 10.3 | 10.2 | 10.5 | 10.3 | 11.5 | 8.34 | 9.17 | 11.6 | 11.2 |
| Tensile Elongation (%) | 51 | 59 | 72 | 7 | 6 | 70 | 37 | 36 | 61 | 23 | 62 | 68 |
| Tensile Modulus (kpsi) | 458 | 301 | 393 | 424 | 442 | 351 | 353 | 428 | 424 | 447 | 409 | 404 |
| N.I. (ft-lb/in) | 1.5 | 0.9 | 0.9 | 1.2 | 1.4 | 0.8 | 0.9 | 1.0 | 1.3 | 1.6 | 1.0 | 0.8 |
| Reverse N.I. (ft-lb/in) | 19.1 | 22.6 | 20.6 | 21.1 | 25.1 | 19.6 | 12.5 | 14.1 | 27.0 | 27 | 25.7 | 16.5 |
| Relative delam.[d] | 2 | 2–3 | 3 | 3 | 3 | 2–3 | 3 | 3 | 2–3 | 2–3 | 3 | 3 |

[a]C is Clearon.
[b]all blend ingredients throat-fed.
[c]PEI-Bondfast added as preextruded concentrate.
[d]Relative delamination determined by breaking large tensile bar (1 = best; 5 = worst).

As is exhibited in Table 10, there is only a small increase (14–23%) in flow when 1–2 phr Arkon is added to the formulation in all-throat-fed blends, while a significant increase in flow (21–85% at 1–5 phr) and reasonable retention of desirable mechanical properties were obtained using Clearon P-125. At the same loading of Clearon there is evidently an advantage for both flow and blend properties using preextruded PEI-Bondfast concentrate (Sample 83) rather than simply throat-feeding all the ingredients simultaneously (Sample 82). Meanwhile, significant increase in flow (44–94% at 3–5 phr) and reasonable retention of desirable mechanical properties were obtained using Benzoflex plasticizer.

From the tests, it is determined that, in general, mechanical and flow properties of compositions formed with the "A" processing conditions were better than those prepared with the "B" processing conditions. Additionally, PEI/PPE/Bondfast E compositions can be produced using an all throat-fed process or by a process in which all, or a portion of, the Bondfast E is pre-extruded with either the PEI or the PPE. Furthermore, single-step blends made by extruding the polyetherimide, PPE, functionalization agent, and compatibilizer in one step exhibited low impact strength. Consequently two-step blends, i.e., pre-extruding PPE and functionalization agent first and then extruding the functionalized PPE, polyetherimide and compatibilizer, and three-step blends, i.e., pre-extruding PPE and functionalized agent, pre-extruding polyetherimide and compatibilizer to make a concentrate, and then extruding the concentrate and functionalized PPE together, are preferred. It was further determined that with the use of the epoxy-functionalized impact modifier, poly(arylene ether)-polyetherimide compositions with improved properties over conventional compositions can be formed without the use of amine-rich polyetherimide (i.e. polyetherimide can be used having less than about 40 $\mu$eq/g acid titratable groups, and even less than 15 or 10 $\mu$eq/g). One example of a potential use for these compositions includes automotive applications such as head lamp bulb sockets and head lamp reflectors.

We claim:

1. A thermoplastic resin composition, comprising a mixture, based on 100 pbw of the thermoplastic resin composition, of:
    (a) about 40 to about 90 pbw of a polyetherimide resin;
    (b) about 8 to about 60 pbw of a functionalized poly(arylene ether) resin having a bound base-titratable functionality level of at least 50 $\mu$eq/g; and
    (c) about 0.2 to about 35 pbw of a copolymer of an olefin and an epoxy-functionalized monomer.

2. A thermoplastic resin composition as in claim 1, wherein said functionalized poly(arylene ether) resin was prepared by reaction of a poly(arylene ether) with alpha, beta unsaturated carbonyl compounds, alpha-hydroxy carbonyl compounds, trimellitic anhydride aryl esters, or a combination thereof.

3. A thermoplastic resin composition as in claim 2, wherein said functionalized poly(arylene ether) resin was prepared by reaction of a poly(arylene ether) with a maleic anhydride, maleic acid, fumaric acid, citraconic anhydride, citraconic acid, itaconic anhydride, itaconic acid, aconitic anhydride, aconitic acid, esters and amines thereof; citric acid; malic acid; trimellitic anhydride phenyl salicylate; or combinations thereof.

4. A thermoplastic resin composition as in claim 1, wherein the composition comprises about 60 to about 70 pbw of said polyetherimide resin about 26 to about 40 pbw of said poly(arylene ether) resin and about 1 to about 3 pbw of said copolymer of an olefin and an epoxy-functionalized monomer.

5. A thermoplastic resin composition as in claim 1, wherein said base-titratable functionality level is from 50 $\mu$eq/g to about 500 $\mu$eq/g.

6. A thermoplastic resin composition as in claim 1, wherein said base-titratable functionality level is from about 50 $\mu$eq/g to about 250 $\mu$eq/g.

7. A thermoplastic resin composition as in claim 1, wherein said base-titratable functionality level is about 80 $\mu$eq/g to about 120 $\mu$eq/g.

8. A thermoplastic resin composition as in claim 1, wherein said epoxy-functionalized monomer is glycidyl acrylate, glycidyl methacrylate, or a combination thereof.

9. A thermoplastic resin composition as in claim 1, wherein said copolymer of an olefin and an epoxy-functionalized monomer is poly(ethylene-co-glycidyl methacrylate).

10. A thermoplastic resin composition as in claim 1, wherein the polyetherimide resin comprises structural units of the formula (I):

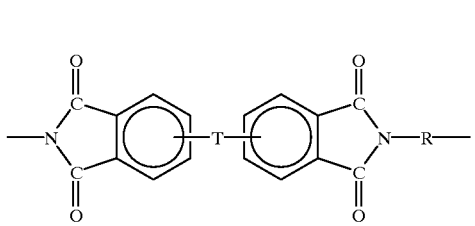

(I)

wherein T is —O— or a group of the formula —O—Z—O— wherein the divalent bonds of the —O— or the —O—Z—O— group are in the 3,3', 3,4', 4,3', or the 4,4' positions; Z is of formulae (II):

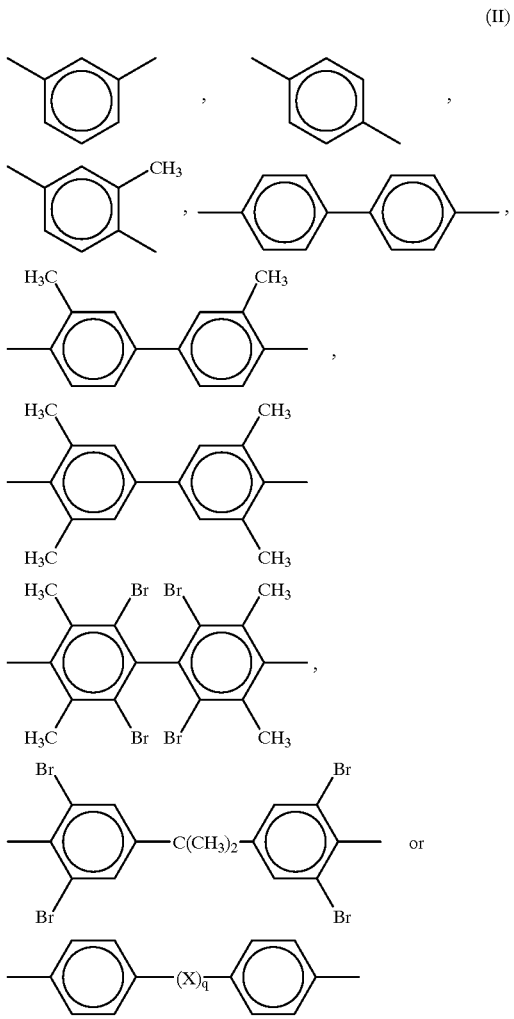

(II)

wherein X is of formulae (III):

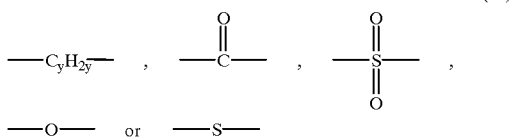

wherein y is an integer from 1 to about 5, and q is 0 or 1; R is a divalent organic radical of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, or (d) divalent radicals of formula (IV):

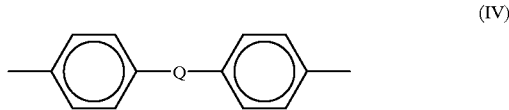

where Q is of formulae (V):

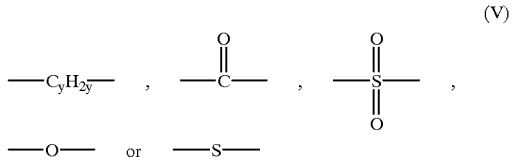

where y is an integer from about 1 to about 5.

11. A thermoplastic resin composition as in claim 1, further comprising gloss improver comprising a functionalized silicone fluid, poly(ethylene naphthalate), polyamide, or a combination thereof.

12. A thermoplastic resin composition as in claim 1, further comprising less than about 0.75 phr of a functionalized silicone fluid.

13. A thermoplastic resin composition as in claim 12, further comprising about 0.30 to about 0.60 phr aminofunctionalized silicone fluid.

14. A thermoplastic resin composition as in claim 1, further comprising a metal catalyst.

15. A thermoplastic resin composition as in claim 14, wherein said metal catalyst is titanium dioxide, sodium stearate, zinc stearate, or a combination thereof.

16. A thermoplastic resin composition as in claim 15, wherein said sodium stearate, zinc stearate, or a combination thereof is present in an amount of about 0.005 to about 0.01 phr.

17. A thermoplastic resin composition as in claim 1, further comprising glass, wherein said composition has a knitline strength exceeding about 5,000 psi measured by double gated tensile testing.

18. A thermoplastic resin composition as in claim 1, further comprising glass, wherein said composition has a knitline strength exceeding about 7,500 psi measured by double gated tensile testing.

19. A thermoplastic resin composition as in claim 1, wherein the composition has a reverse notched Izod impact strength exceeding about 20 ft-lb/in.

20. A thermoplastic resin composition as in claim 1, wherein the composition has a reverse notched Izod impact strength exceeding about 25 ft-lb/in.

21. A thermoplastic resin composition as in claim 1, wherein said poly(arylene ether) comprises 2,6-dimethylphenylene ether units, 2,3,6-trimethyl phenylene ether units, copolymers derived from copolymerization of 2,6-dimethylphenol with 2,3,6-trimethylphenol, or combinations thereof.

22. A thermoplastic resin composition as in claim 1, wherein said polyetherimide has an acid-titratable functionality level of about 15 $\mu$eq/g or less.

23. A thermoplastic resin composition as in claim 1, wherein said polyetherimide has an acid-titratable functionality level of about 10 $\mu$eq/g or less.

24. An article formed from the thermoplastic resin composition of claim 1.

25. An article as in claim 24, wherein the article is an automotive component.

26. A thermoplastic resin composition, comprising the reaction product of:
  (a) about 40 to about 90 pbw of a polyetherimide resin;
  (b) about 8 to about 60 pbw of a functionalized poly(arylene ether) resin having a bound base-titratable functionality level of at least about 50 $\mu$eq/g; and
  (c) about 0.2 to about 35 pbw of a copolymer of an olefin and an epoxy-functionalized monomer.

27. A thermoplastic resin composition as in claim 26, wherein said functionalized poly(arylene ether) resin was prepared by reaction of a poly(arylene ether) with alpha, beta unsaturated carbonyl compounds, alpha-hydroxy carbonyl compounds, trimellitic anhydride aryl esters, or a combination thereof.

28. A thermoplastic resin composition as in claim 27, wherein said functionalized poly(arylene ether) resin was prepared by reaction of a poly(arylene ether) with a maleic anhydride, maleic acid, fumaric acid, citraconic anhydride, citraconic acid, itaconic anhydride, itaconic acid, aconitic anhydride, aconitic acid, esters and amines thereof; citric acid; maleic acid; trimellitic anhydride phenyl salicylate; or combinations thereof.

29. A thermoplastic resin composition as in claim 26, wherein the composition comprises about 60 to about 70 pbw of said polyetherimide resin about 26 to about 40 pbw of said poly(arylene ether) resin and about 1 to about 3 pbw of said copolymer of an olefin and an epoxy-functionalized monomer.

30. A thermoplastic resin composition as in claim 26, wherein said base-titratable functionality level is from 50 $\mu$eq/g to about 500 $\mu$eq/g.

31. A thermoplastic resin composition as in claim 26 wherein said base-titratable functionality level is from about 50 $\mu$eq/g to about 250 $\mu$eq/g.

32. A thermoplastic resin composition as in claim 26 wherein said base-titratable functionality level is about 80 $\mu$eq/g to about 120 $\mu$eq/g.

33. A thermoplastic resin composition as in claim 26, wherein said epoxy-functionalized monomer is glycidyl acrylate, glycidyl methacrylate, or a combination thereof.

34. A thermoplastic resin composition as in claim 26, wherein said copolymer of an olefin and an epoxy-functionalized monomer is poly(ethylene-co-glycidyl methacrylate).

35. A thermoplastic resin composition as in claim 26, wherein said poly(arylene ether) comprises 2,6-dimethylphenylene ether units, 2,3,6-trimethyl phenylene ether units, copolymers derived from copolymerization of 2,6-dimethylphenol with 2,3,6-trimethyiphenol or combinations thereof.

36. A thermoplastic resin composition as in claim 26, wherein said polyetherimide has an acid-titratable functionality level of about 15 $\mu$eq/g or less.

37. A thermoplastic resin composition as in claim 26, wherein said polyetherimide has an acid-titratable functionality level of about 10 µeq/g or less.

38. A thermoplastic resin composition as in claim 26, further comprising glass, wherein said composition has a knitline strength exceeding about 5,000 psi measured by double gated tensile testing.

39. A thermoplastic resin composition as in claim 26, further comprising glass, wherein said composition has a knitline strength exceeding about 7,500 psi measured by double gated tensile testing.

40. An article formed from the thermoplastic resin composition of claim 26.

41. An article as in claim 40, wherein the article is an automotive component.

42. A method for making a thermoplastic resin composition, comprising the steps of:

combining about 40 to about 90 pbw of a polyetherimide resin, about 8 to about 60 pbw of a poly(arylene ether) resin, a sufficient amount of functionalization agent to cause said poly(arylene ether) resin to have a bound base titratable functionality level of at least 50 µeq/g, and about 0.2 to about 35 pbw of a copolymer of an olefin and an epoxy-functionalized monomer to form the composition.

43. A method for making a thermoplastic resin composition as in claim 42, further comprising:

(a) pre-extruding said poly(arylene ether) resin with said functionalization agent to form a functionalized poly (arylene ether) resin; and (b) extruding said functionalized poly(arylene ether) resin with said polyetherimide and said copolymer of an olefin and an epoxy-functionalized monomer to form the composition.

44. A method for making a thermoplastic resin composition as in claim 43, further comprising using a twin-screw extruder to perform said pre-extrusion and extrusion steps.

45. A method for making a thermoplastic resin composition as in claim 43, wherein said functionalization agent is alpha, beta unsaturated carbonyl compounds, alpha-hydroxy carbonyl compounds, trimellitic anhydride aryl esters, or a combination thereof.

46. A method for making a thermoplastic resin composition as in claim 43, wherein said functionalization agent is a maleic anhydride, maleic acid, fumaric acid, citraconic anhydride, citraconic acid, itaconic anhydride, itaconic acid, aconitic anhydride, aconitic acid, esters and amines thereof; citric acid; malic acid; trimellitic anhydride phenyl salicylate; or combinations thereof.

47. A method for making a thermoplastic resin composition as in claim 43, wherein the composition comprises about 60 to about 70 pbw of said polyetherimide resin about 26 to about 40 pbw of said poly(arylene ether) resin and about 1 to about 3 pbw of said copolymer of an olefin and an epoxy-functionalized monomer.

48. A method for making a thermoplastic resin composition as in claim 43, wherein said poly(arylene ether) comprises 2,6-dimethylphenylene ether units, 2,3,6-trimethyl phenylene ether units, copolymers derived from copolymerization of 2,6-dimethylphenol with 2,3,6-trimethylphenol or combinations thereof.

49. A method for making a thermoplastic resin composition as in claim 42, further comprising:

(a) pre-extruding said poly(arylene ether) resin with said functionalization agent to form a functionalized poly (arylene ether) resin;

(b) pre-extruding said polyetherimide and said copolymer of an olefin and an epoxy-functionalized monomer to form a concentrate; and (c) extruding said functionalized poly(arylene ether) resin with said concentrate to make the composition.

50. A method for making a thermoplastic resin composition as in claim 49, wherein said functionalization agent is alpha, beta unsaturated carbonyl compounds, alpha-hydroxy carbonyl compounds, trimellitic anhydride aryl esters, or a combination thereof.

51. A method for making a thermoplastic resin composition as in claim 49, wherein said functionalization agent is a maleic anhydride, maleic acid, fumaric acid, citraconic anhydride, citraconic acid, itaconic anhydride, itaconic acid, aconitic anhydride, aconitic acid, esters and amines thereof; citric acid; malic acid; trimellitic anhydride phenyl salicylate; or combinations thereof.

52. A method for making a thermoplastic resin composition as in claim 49, wherein the composition comprises about 60 to about 70 pbw of said polyetherimide resin about 26 to about 40 pbw of said poly(arylene ether) resin and about 1 to about 3 pbw of said copolymer of an olefin and an epoxy-functionalized monomer.

53. A method for making a thermoplastic resin composition as in claim 49, wherein said poly(arylene ether) comprises 2,6-dimethylphenylene ether units, 2,3,6-trimethyl phenylene ether units, copolymers derived from copolymerization of 2,6-dimethylphenol with 2,3,6-trimethylphenol, or combinations thereof.

54. A method for making a thermoplastic resin composition as in claim 49, wherein said polyetherimide has an acid-titratable functionality level of about 15 µeq/g or less.

55. A method for making a thermoplastic resin composition as in claim 49, wherein said polyetherimide has an acid-titratable functionality level of about 10 µeq/g or less.

* * * * *